United States Patent

[11] 3,566,095

[72] Inventor Herbert E. Schmitz
 Amherst, N.H.
[21] Appl. No. 731,003
[22] Filed May 22, 1968
[45] Patented Feb. 23, 1971
[73] Assignee Sanders Associates, Inc.
 Nashua, N.H.

[54] BASIC TIME INTERVAL INTEGRATOR
 8 Claims, 4 Drawing Figs.
[52] U.S. Cl. .................................................. 235/158,
 235/193.5
[51] Int. Cl. .................................................. G06f 7/38
[50] Field of Search .......................................... 235/158,
 193.5; 328/144, 158

[56] References Cited
 UNITED STATES PATENTS
2,817,477 12/1957 Williams ..................... 235/158X
2,912,162 11/1959 Shou-I Nee ................... 235/158
3,225,181 12/1965 Styner ......................... 235/158

Primary Examiner—Malcolm A. Morrison
Assistant Examiner—James F. Gottman
Attorney—Louis Etlinger ABSTRACT: A system for generating timing pulses proportional to the square root of the elapsed number of linear clock pulses employs a reference counter and a linear clock counter, the latter of which counts pulses from a linear clock. A comparator compares the counts in the counters and emits an output pulse when the two counts are the same. In response to successive output pulses from the comparator, the count in the reference counter increases by successive odd numbers and the linear clock counter recounts pulses from the linear clock until its count again equals that in the reference register, so that the successive pulses from the comparator are spaced from their predecessors by a uniformly increasing odd number of linear clock pulses.

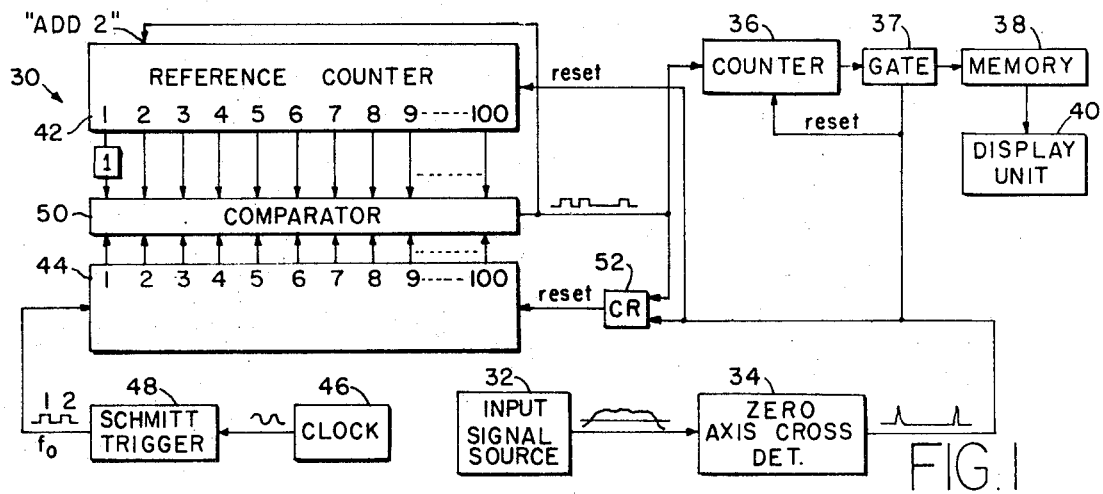
FIG. 1
FIG. 2
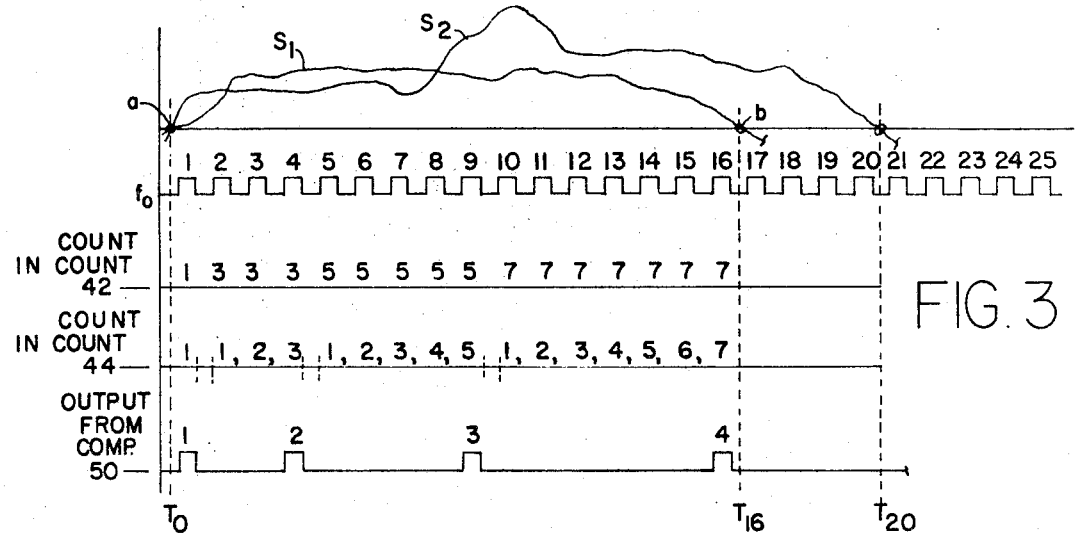
FIG. 3
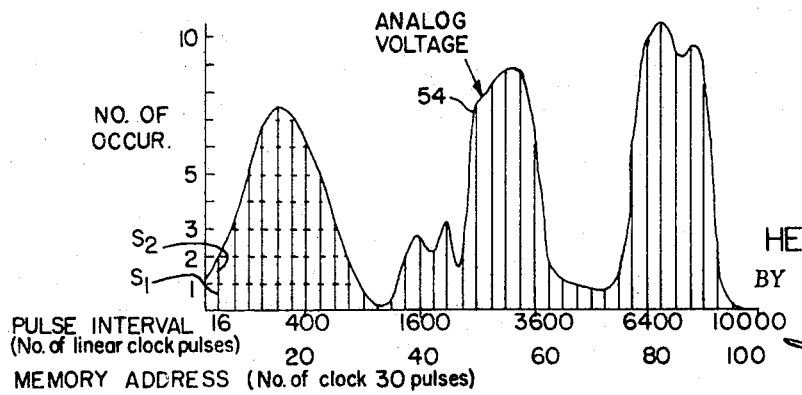
FIG. 4
*INVENTOR.*
HERBERT E. SCHMITZ
BY
*ATTORNEY*

BASIC TIME INTERVAL INTEGRATOR

BACKGROUND OF THE INVENTION

This invention relates to an electronic timing system. It relates more particularly to an electronic clock which generates output pulses at intervals proportional to the square root of the number of linear clock pulses that have elapsed.

The system described herein has many varied applications. For example, it may be used as sampling frequency generator to control the rate of sampling of an electrical signal. It has particular application as a reference signal generator in various types of signal analyzers and comparators.

To illustrate, it is often desirable to obtain a statistical picture of the pulse durations of a series of quasi-periodic signals. Normally, this is done by counting the number of clock pulses occurring between the zero axis crossings of these signals. The system then stores in a memory the number of times that each of the measured intervals has occurred. In a system with 100 memory addresses or "bins", the number of occurrences of each of one hundred different time intervals can be stored. After measuring many of these signals, the system builds up a distribution pattern of the interval occurrence rates. This pattern may then be compared with the pattern produced by a known set of signals, e.g., Morse code.

Normally, the dynamic range of such a system is limited by the number of memory "bins" therein. That is, a one hundred "bin" system employing a linear clock has a dynamic range of 100 to 1. This means that this system can only measure pulse intervals having the duration of one clock pulse up to 100 clock pulses. Any signal having a pulse interval greater than 100 clock pulses cannot be accommodated by the system. Consequently, unless an unduly large memory is used, a system using a linear 15 clock is not capable of building up a meaningful interval distribution pattern for pulses which vary greatly in length.

The obvious way to extend the dynamic range of the system is to enlarge its memory capacity to, say, 1,000 "bins". Needless to say, however, this solution entails a concommitant increase in the cost and complexity of the system. A much better and less expensive solution is to employ a nonlinear clock such as the one disclosed herein which generates signals on a gradually expanding time scale.

SUMMARY OF THE INVENTION

Accordingly, it is an object of this invention to provide an electronic timing system for extending the dynamic range of a system for measuring the pulse intervals of quasi-periodic signals. A further object is to provide an improved system for measuring the pulse duration of quasi-periodic or aperiodic signal intervals.

Another object of the invention is to provide an electronic clock which generates clock pulses on a gradually expanding time scale.

Another object of the invention is to provide clock which generates pulses at intervals proportional to the square root of the elapsed number of elapsed time.

A still further object of the invention is to provide a square count clock employing a relatively few conventional electrical components.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the present system measures the pulse intervals in signals by counting the number of clock pulses occurring between the zero axis crossings of the signals. However, the system generates the pulses on a gradually expanding time scale so that there are proportionately fewer output pulses for the longer intervals in the signals being examined. Specifically, it generates the pulses at intervals of occurrence proportional to the square root of the number of linear clock pulses elapsed between the axis crossings of the signal.

The system employs a counter which commences counting pulses from a linear clock upon the occurrence of the beginning of the interval to be measured, i.e., a zero axis crossing of the signal. A comparator compares the contents of the linear clock counter with the contents of a reference counter which has an initial count of one. The first counter continues counting until its count equals the count in the reference register whereupon the comparator emits a pulse signifying that the counts in the two counters are the same. The output from the comparator constitutes the output of the timing system as a whole.

Also, the output from the comparator is applied to the reference counter so that each pulse from the comparator causes the reference register to add two to the count already in that register. Further, the output from the comparator clears the linear clock counter so that the latter counter starts recounting after each pulse from the comparator.

Thus, at the first axis crossing the signal being examined, the reference counter has a one count. The linear clock counter commences counting until its count equals the count of the reference counter, i.e., one. Thus, the comparator emits an output pulse upon the occurrence of the first pulse from the linear clock immediately following the axis crossing of the signal being examined. This pulse from the comparator is also applied to the reference counter, thereby increasing the content thereof to three. The linear clock counter again starts counting pulses from the linear clock and continues until its count equals that of the reference counter, i.e., three. At this point, the comparator emits a second output pulse which is spaced three linear clock pulses from the first output pulse. This second output pulse corresponds to the fourth pulse from the linear clock; thus the number of this output pulse is the square root of the total number of linear clock pulses.

As before, this second pulse from the comparator adds two to the content of the reference counter for a new count of five. The linear clock counter now begins anew to count pulses from the linear clock. When it reaches the count of five, the comparator emits a third output signal which trails the previous output signal by five linear clock pulses. The total number of the latter pulses in nine and thus the number of output pulses again equals the square root of the number of linear clock pulses since the beginning of the sequence.

This process continues so that with each output signal from the comparator, the count in the reference counter increases by successive odd numbers and the linear clock counter recounts until its count again equals that of the reference counter. The comparator emits successive pulses at intervals of occurrence proportional to the square root of the number of pulses from the linear clock which have elapsed from the first axis crossing of the signal being examined. That is, the identifying number of the pulse from the comparator is the square root of the number of the elapsed time from axis crossing.

The system continues to provide output pulses until the signal being examined again crosses the zero axis, at which time both counters are reset. The total number of output pulses is an indication of the length of the interval in question. Since the pulses from the comparator are spaced progressively further apart, only a relatively few of them are needed to indicate a very long interval. For example, the comparator emits only 10 pulses to indicate an interval corresponding to 100 linear clock pulses.

Thus, if the present timing arrangement is used as the reference clock in the aforementioned 100 "bin" system for measuring pulse intervals, the dynamic range of the system is increased to 10,000 to 1. Thus, the same system is now capable of recording pulse intervals as short as 1 linear clock pulse and as long as 10,000 linear clock pulses. This gives a system having the same memory capacity much greater flexibility and ability to monitor signals having pulse intervals of very different duration. Thus, an operator can use such a system to recognize signals which may vary widely in absolute time duration, but which maintain fixed relationships with one another, i.e. Morse code signals sent by different people. Yet, with all these advantages, the new clock employs only a relatively few conventional, inexpensive electrical components. Moreover, it needs no sensitive adjustment.

BRIEF DESCRIPTION OF THE DRAWINGS

For a fuller understanding of the nature and objects of the invention, reference should be had to the following detailed description taken in connection with the accompanying drawings, in which:

FIG. 1 is a block diagram of the timing system for measuring the pulse duration of various pulses;

FIG. 2 is a graphical representation of a typical signal containing pulses whose intervals may be examined by the FIG. 1 system;

FIG. 3 is a graphical representation indicating the operation of the various elements of the FIG. 1 system; and FIG. 4 is a graphical representation showing a typical distribution pattern of pulse intervals measured with the FIG. 1 system.

DESCRIPTION OF THE PREFERRED EMBODIMENT

Referring now to FIG. 1, a square count clock indicated at 30 made in accordance with this invention is used as the reference source in a system for measuring the pulse interval of a quasi-periodic pulse signal from an input signal source 32. The input signal is applied to a zero axis-crossing detector 34 which generates an output pulse each time the input signal crosses the zero axis. Thus, the intervals between successive pulses from detector 34 demark the pulse intervals in the input signal from source 32. Each pulse from detector 34 resets the clock 30 so that it commences generating output pulses in a nonlinear fashion as will be described in detail later.

The output pulses from clock 30 are counted by a counter register 36 whose contents then represent the total number of output pulses emitted from clock 30 during an interval between successive pulses from detector 34, i.e. during a given pulse interval in the input signal. Each pulse from detector 34 also enables a plate 37 which transfers the information then in register 36 to a memory 38. And the detector pulse resets both clock 30 and register 36 to place the system in a position to measure the next pulse interval in the input signal from source 32. Thus, successive trains of pulses from the clock 30 are counted by register 36 and the occurrences of the various counts are recorded in memory 38. The counts of successive clock pulse trains reflect the lengths of the successive pulse intervals in the input signal.

Each occurrence of a particular number in register 36 is recorded at memory 38 address or "bin" corresponding to that number. Accordingly, when a given count is repeated, the number in the corresponding memory address is increased by one, so that the content of each memory address is the number of occurrences of a particular pulse interval corresponding to that address. Therefore, after several such measurements, a distribution pattern of pulse interval occurrence rates is stored in the memory 38. This information is then read out of the memory into a display system 40 which converts the contents of the memory address to voltage analogues and displays the resulting pattern on a suitable screen. (See FIG. 4)

Thus, the system displays pulse intervals whose lengths vary as the square of the displacement along the horizontal axis in display system 40. This feature is very useful in permitting an operator to recognize signals which vary in absolute time duration, but which maintain fixed relationships. For example, in Morse Code, the dash is normally three times longer than the dot and the space is five times longer than the dot. Therefore, if the system builds up a distribution picture where these relationships predominate, then the operator will know that the signals from the source 32 are in Morse code. Differences in the signal rates from one time to another are reflected as shifts of the displayed patterns to the right or left in FIG. 4. Because of the time compression provided by the square clock 30, large signal rate variations can be accommodated by the system.

Still referring to FIG. 1, clock 30 comprises a reference counter 42 and a linear clock counter 44. Preferably, both counters have the same capacity. In the illustrated system having a 100 "bin" memory 38, each register is capable of counting up to 100. Reference counter 42 is wired so that it contains a minimum count of one (in its least significant stage). Linear clock counter 44 counts clock pulses $f_o$ derived from a linear clock 46 by a Schmidt trigger 48.

A comparator 50 compares the counts in counters 42 and 44 and whenever these counts are the same, the comparator emits a pulse to counter 36. The output pulse from comparator 50 is also applied to the second least significant stage of reference counter 42. Assuming that the counters are binary counters, this will cause each such pulse to increase the count in counter 42 by two. More particularly, as stated above, counter 42 always has at least a count of one. Upon the occurrence of the first output pulse from comparator 50, the count in counter 42 is increased by two, giving the register a total count of three. The next pulse from comparator 50 again adds two to the count in counter 42, giving it a count of five. Thus, successive output pulses from the comparator cause the count in counter 42 to increase to successive odd numbers.

Each output pulse from comparator 50 also resets counter 44 by way of an OR circuit 52. Thus, each output pulse causes counter 44 to begin anew counting clock pulses $f_o$ from linear clock 46. Counter 44 continues counting until the next pulse from comparator 50 resets it.

FIG. 2 illustrates a typical input signal S which may be examined by the FIG. 1 system. The signal S is made up of many pulses demarked by the zero axis crossings of the signal S. The pulse intervals in signal S vary greatly in length, the shortest interval corresponding to eight pulses from linear clock 46 and the longest pulse interval corresponding to 9,000 linear clock pulses. Also, it will be noticed that some of the pulse intervals in signal S are the same or approximately the same length. For example, interval $S_1$ has a length or duration of 16 linear clock pulses, while interval $S_2$ has an interval of 20 linear clock pulses. The illustrated system having a memory capacity of 100 "bins" is capable of measuring the complete range of pulse intervals represented in signal S. In fact, it can measure intervals as short as one period of clock 46 to as long as 10,000 such clock pulses periods.

Referring to FIGS. 1 and 3, we will described the operation of the system as it measures the pulse interval $S_1$. This interval is depicted at the top of FIG. 3. It is bounded by the zero axis crossings of signal S at points a and b. When the signal S from source 32 crosses the zero axis at point $a$, detector 34 emits a pulse which resets counters 36, 42 and 44 to ready the system for measuring interval $S_1$. Only a one count is contained in reference register 42 at this point.

Counter 44 immediately commences counting pulses $f_o$ from clock 46 and continues until its count equals that of reference register 42, i.e. it counts up to one as indicated in FIG. 3.

Whereupon, comparator 50 emits its first output pulse to counter 36. This pulse is designated pulse "1" in FIG. 3, it coincides with the first clock pulse $f_o$ from clock 46 following the axis crossing point $a$. Pulse 1 from comparator 50 is applied to reference counter 42 and increases its count to three as indicated in FIG. 3. It also resets counter 44. Immediately, that counter begins counting pulses from clock 46 and continues until its count equals three as illustrated in FIG. 3.

At this point, the counts in the two counters are again the same. Comparator 50 emits output pulse "2" (FIG. 3) which is spaced three linear clock pulses from output pulse 1 and coincides with the fourth pulse from clock 46 since the beginning of the pulse interval $S_1$. Output pulse 2 increases the content of reference counter 42 to five and resets counter 44 once more.

After five succeeding clock 46 pulses, the count in counter 44 again equals the content of counter 42 and the comparator 50 emits output pulse 3. As seen in FIG. 3, this pulse is spaced five linear clock pulses from pulse 2 and corresponds to the ninth linear clock pulse from the beginning of the pulse interval $S_1$ being examined. Output pulse 3 advances the content of counter 42 to seven and resets counter 44 so that the latter again begins counting. As soon as counter 44 reaches seven, comparator 50 emits output pulse 4 (FIG. 3). Pulse 4 is 7 clock pulses from pulse 3 and corresponds to the 16th linear clock pulse $f_o$ elapsed the beginning of the pulse interval $S_1$. Counter 36, which has been counting the output pulses, contains a count of four.

At this point, input signal S again crosses the zero axis at point b. Consequently, detector 34 emits a pulse which resets counters 36, 42 and 44 and gates the content of counter 36 into memory 38. The system then immediately commences measuring the signal S pulse interval beginning at point b in the same fashion described above.

Still referring to FIG. 3, a comparison of the output from comparator 50 and the output of clock 46 shows that the output pulses from comparator 50 occur at intervals proportional to the square root of the number of linear pulses from clock 46 elapsed from the beginning of the pulse interval being examined. In other words, the number of each output pulse from comparator 50 is the square root of the number of corresponding pulse from linear clock 46. Therefore, in the previous example, a count of four in counter 36 corresponds to a pulse interval equivalent to 16 linear clock pulses.

FIG. 3 also shows that the successive output pulses from comparator 50 are progressively further apart. Consequently, as the pulse intervals get longer and longer, comparator 50 emits proportionately fewer pulses to counter 36. Thus, in the example of pulse interval $S_1$, a count of only four in register 36 signifies that interval $S_1$ has a duration of 16 linear clock pulses. On the other hand, a count of 100 in counter 36 indicates a pulse interval corresponding to 10,000 linear clock pulses, i.e. the square of the count in counter 36.

It will be apparent also from FIG. 3 that the accuracy of each pulse interval determination corresponds to the number of linear clock pulses between successive comparator 50 output pulses. With longer pulse intervals, indicated by larger numbers of output pulses, the number of linear clock pulses between successive output pulses is greater and the absolute accuracy of measurement diminishes. For example, a square clock output of two will be obtained with an input pulse interval of from 4 to 8 linear clock pulses - an accuracy of 5 linear clock pulses. On the other hand, an output of four will be obtained with an input pulses interval of from 16 to 24 linear clock pulses, an accuracy of 9 linear clock pulses.

However, while absolute accuracy does decrease, as the input pulse interval increases, the relative accuracy increases, a very desirable characteristic when one wishes to obtain good resolution throughout the entire range of the system.

In the same fashion, the present system measures the pulse intervals of the successive pulses making up the input signal S from source 32. Each different count in register 36, corresponding to a different length pulse interval, is stored at a different address in memory 38. Further, each time the system detects the same pulse interval (as measured to the last comparator 50 pulse as described above), the count at the corresponding address in memory 38 is increased by one.

Thus, memory 38 builds up a distribution pattern of the pulse intervals in the signal S. This is illustrated graphically in FIG. 4 where each small vertical segment indicates one occurrence of a pulse interval in a particular range of intervals. In the illustration, each such range clock corresponds to the difference between successive pulse counts of the square clock 30, as registered by the counter 36. For example, FIG. 4 shows pulse intervals $S_1$ and $S_2$ having durations of 16 and 20 linear clock pulses, respectively, as both identified by the square clock count of four. All other pulse intervals corresponding to the difference between counts of four and five, i.e. 16 to 24 linear clock intervals, will similarly be identified with the count of four.

This display unit 40 contains a digital-to-analog converter that converts the contents of the respective memory 38 addresses into voltages representing these contents. As the display unit sequences through successive memory addresses, these voltages are displayed at successive horizontal positions in the display. The result is a curve such as is represented by the curve 54 in FIG. 4, which represents the distribution pattern of the interval ranges in signal S. This pattern may now be compared with the distribution pattern of a known signal, e.g. a Morse code signal, to determine if signal S is also such a coded signal.

In this way, the present system can measure very widely varying pulse intervals, even though it has a relatively limited memory capacity. As mentioned above, an operator can recognize signal patterns, such as Morse code, in which the components may vary widely in absolute time duration, but maintain relatively fixed relationships with one another. This wide dynamic range is accomplished without an undue increase in the cost or complexity of the apparatus as a whole.

Using the same technique, a system can be made which generates a train of signals that grow further apart at an even faster rate. For example, the signal from the comparator 50 may be applied to the third stage of register 42 so that each such signal increases the count in that register by four units. Then each signal from comparator 50 will be spaced from its predecessor by even more linear clock pulses then in the square arrangement specifically described above.

Also, a fourth power clock can be constructed by operating two square clocks in tandem. The first one operates as in FIG. 1 to provide a square output. This output is used in place of the linear clock output in the second square clock. Thus, by squaring the output of the first clock, the second one provides a fourth power output. Other variations and extensions of the arrangement described herein will also be apparent.

It will thus be seen that the objects set forth above, among these made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A signal generator comprising:
    A. a source of clock signals;
    B. a first counter coupled to receive and to count said clock signals;
    C. a second counter having an initial count of one;
    D. means for comparing the counts in said counters, said comparing means emitting an output signal whenever said counts coincide; and
    E. means for coupling each said output signal;
        1. as a reset signal to said first counter, so that said first counter begins counting anew; and
        2. to said second counter so as to increase the count therein by two units, whereby said comparing means emits a train of output signals, each said output signal corresponding to the square root of the number of said clock pulses occurring since the beginning of said train of output signals.

2. A signal generator as defined in claim 1 wherein said clock signals are uniformly spaced.

3. A signal generator as defined in claim 1 and further including means for simultaneously resetting said first and second counters so as to interrupt said train of output signals.

4. Apparatus as defined in claim 3 for recording pulse intervals in an input signal, said apparatus further comprising:
    A. a third counter arranged to count said output signals from said comparing means;
    B. a memory;

C. means for addressing said memory according to the contents of said third counter, and increasing the content of each location in said memory each time that location is addressed; and
D. means for detecting the beginning and end of each pulse in said input signal, said detecting means emitting control signals to said addressing means at the beginning and end of each pulse in said input signal so as:
   1. to address said memory and increase the content of the location so addressed; and
   2. reset said counters.

5. A square count clock comprising:
A. a source of linear clock signals;
B. a first counter coupled to received and to count said clock signals;
C. a second counter arranged to count by two's from an initial content of one so as to contain only odd numbers;
D. means for comparing the counts in said counters, said comprising means emitting an output signal whenever said counts are the same;
E. means for coupling each said output signal:
   1. as a reset signal to said first counter so that it starts counting anew; and
   2. to said second counter so as to increase its count to the next odd number, whereby said comparing means emits a train of output signals, each of said output signals corresponding to the square root of the number of linear clock signals elapsed from the beginning of said train of output signals.

6. A square count clock as defined in claim 5 and further including means for resetting said counters to interrupt said train of signals.

7. A clock as defined in claim 6 for measuring pulse intervals in an input signal, said clock further comprising:
A. a third counter arranged to count said output signals from said comprising means;
B. a memory;
C. means for addressing said memory according to the contents of said third counter and increasing the content of each memory location whenever that location is addressed; and
D. a detector for detecting the zero axis crossings of said input signal, said detector emitting control signals whenever said input signal crosses said zero axis, each said control signal:
   1. actuating said addressing means so as to increase the content of the memory location so addressed; and
   2. resetting said counters to ready the system for measuring the next pulse interval.

8. Apparatus as defined in claim 7 and further including a display system for displaying the distribution of counts stored in said memory.

PO-1050
(5/69)

UNITED STATES PATENT OFFICE
CERTIFICATE OF CORRECTION

February 23, 1971

Patent No. 3,566,095            Dated

Inventor(s) Herbert E. Schmitz

It is certified that error appears in the above-identified patent and that said Letters Patent are hereby corrected as shown below:

Column 1, line 57 change "Provide clock" to --Provide a clock--; Column line 44 change "enables a plate" to --enables a gate--; Column 5 line 11 change "elapsed the beginning" to --elapsed from the beginning--; Colun line 49 change "input pulses interval" to --input pulse interval--; Colum line 67 change "such range clock corresponds" to --such range correspo Column 6 line 1 change "This Display" to --The Display--; Column 7 lin change "comprising means to --comparing means--; Column 8 line 9 ch "comprising means" to --comparing means--.

Signed and sealed this 6th day of July 1971.

(SEAL)
Attest:

EDWARD M. FLETCHER, JR.
Attesting Officer

WILLIAM E. SCHUYLER, JR.
Commissioner of Patents